US012650359B2

(12) United States Patent (10) Patent No.: US 12,650,359 B2
Patterson et al. (45) Date of Patent: Jun. 9, 2026

(54) PROBABILITY-BASED PIPELINE LEAK MONITORING TOOL

(71) Applicant: Chevron U.S.A. Inc., San Ramon, CA (US)

(72) Inventors: Joseph Eli Patterson, Houston, TX (US); Jennifer Michelle Cain Meyer, Houston, TX (US)

(73) Assignee: Chevron U. S. A. Inc., San Ramon, CA (US)

( * ) Notice: Subject to any disclaimer, the term of this patent is extended or adjusted under 35 U.S.C. 154(b) by 301 days.

(21) Appl. No.: 18/463,934

(22) Filed: Sep. 8, 2023

(65) Prior Publication Data

US 2025/0085184 A1    Mar. 13, 2025

(51) Int. Cl.
*G01M 3/28* (2006.01)
*F17D 5/02* (2006.01)

(52) U.S. Cl.
CPC ............. *G01M 3/2815* (2013.01); *F17D 5/02* (2013.01)

(58) Field of Classification Search
CPC ............ G01M 3/00; G01M 3/26; G01M 3/28; G01M 3/2815; F17D 5/00; F17D 5/02
See application file for complete search history.

(56) References Cited

U.S. PATENT DOCUMENTS 11,274,797 B1 * 3/2022 Zhu ..................... G01M 3/2815

FOREIGN PATENT DOCUMENTS

CN       113446519 A  *  9/2021  .......... G01M 3/2815

OTHER PUBLICATIONS

Machine Translation of CN 113446519-A (Year: 2021).*
"Tahiti Subsea Operating Procedures"; Tahiti; Jun. 27, 2018; (6).
Leimkuhler, J., Olivier, J., & Seah, H. H.; "Technical Solutions for Subsea Leak Detection"; OOC Subsea Leak Detection Working Group, Advanced Monitoring Subcommittee; Aug. 9, 2018; (18).
Leimkuhler, J.; "Subsea Leak Detection"; LLOG Exploration; May 17, 2018; (15).
Seah, H.H.; "Conditional Rate of Change (C-ROC) Alarm Technical Specifications"; Shell Global; Jul. 18, 2018; (27).

* cited by examiner

*Primary Examiner* — Nguyen Q. Ha
(74) *Attorney, Agent, or Firm* — Sheppard, Mullin, Richter & Hampton LLP

(57) ABSTRACT

Pressures of fluid inside a pipeline are measured at one or more locations along the pipeline. Pressure change rates at the location(s) along the pipeline are determined using the measured pressures, a moving average of the measured pressures, and sampling intervals for the measured pressures. Pressure change rate cumulative distribution function (s) for the location(s) along the pipeline are generated based on the pressure change rates over time. The pressure change rate cumulative distribution function(s) are then used to generate probabilities of leaks along the pipeline, and/or to convert the pressure change rates over time to probabilities of leaks along the pipeline. The probabilities of leaks along the pipeline are used to monitor the pipeline for leaks.

20 Claims, 8 Drawing Sheets

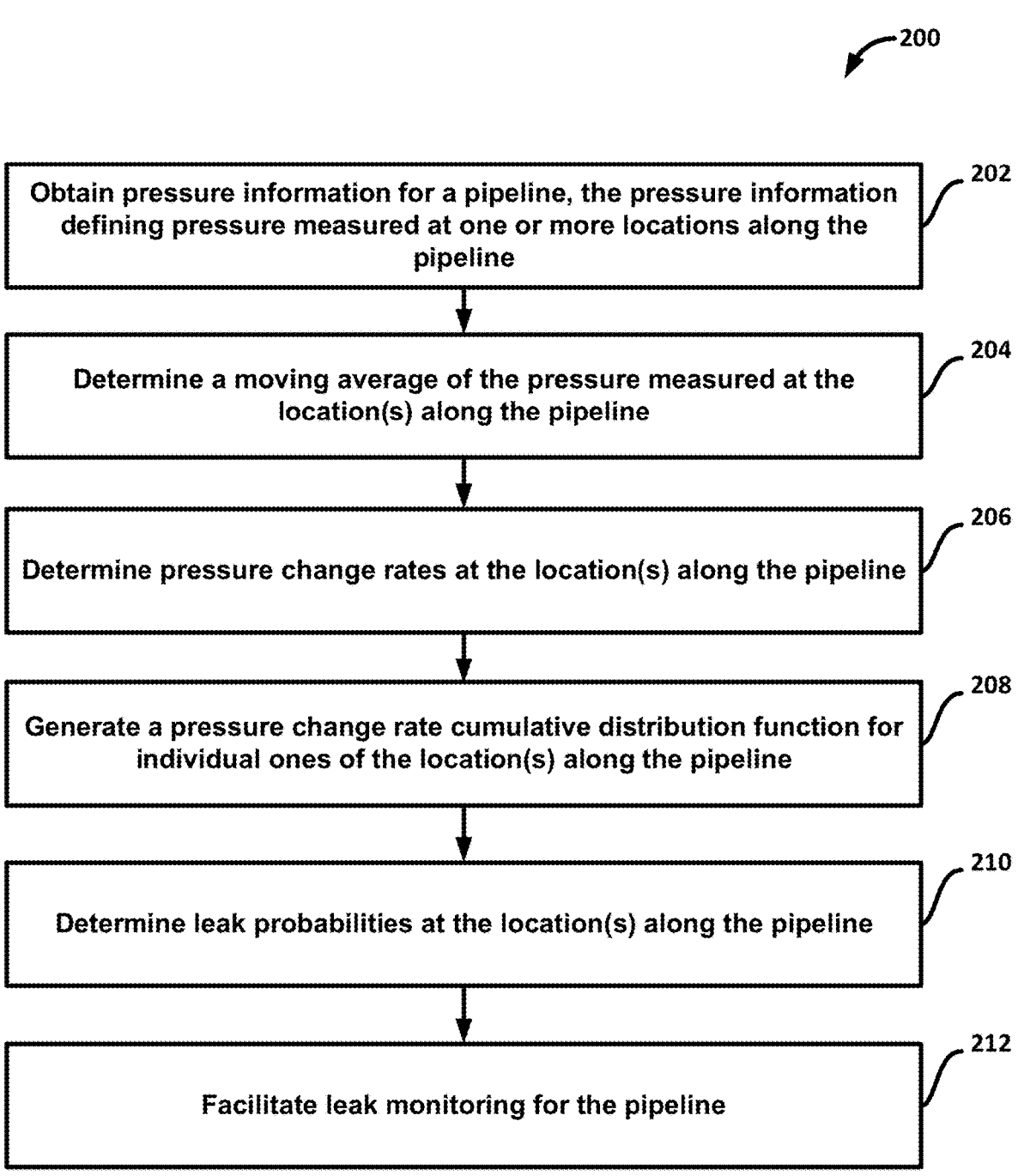

200

Obtain pressure information for a pipeline, the pressure information defining pressure measured at one or more locations along the pipeline          202

Determine a moving average of the pressure measured at the location(s) along the pipeline          204

Determine pressure change rates at the location(s) along the pipeline          206

Generate a pressure change rate cumulative distribution function for individual ones of the location(s) along the pipeline          208

Determine leak probabilities at the location(s) along the pipeline          210

Facilitate leak monitoring for the pipeline          212

| Pressure Sensor | Leak |
|---|---|
| Location A | 55 |
| Location B | 76 |
| Location C | 91 |
| Location D | 124 |
| Location E | 88 |

650

| | Location A | Location B | Location C | Location D | Location E |
|---|---|---|---|---|---|
| Location A | | 3 | 9 | 5 | 5 |
| Location B | | | 6 | 4 | 5 |
| Location C | | | | 12 | 7 |
| Location D | | | | | 25 |
| Location E | | | | | |

FIG. 6

PROBABILITY-BASED PIPELINE LEAK MONITORING TOOL

FIELD

The present disclosure relates generally to the field of monitoring pipeline leaks.

BACKGROUND

Leaks along a pipeline may cause loss of fluid and equipment failure. Accurate detection of leaks along a pipeline may enable the leaks to be addressed promptly.

SUMMARY

This disclosure relates to monitoring pipeline leaks. Pressure information for a pipeline and/or other information may be obtained. The pressure information may define pressures measured at one or more locations along the pipeline. The pressures may be measured at the location(s) along the pipeline at a pace of one or more sampling intervals. A moving average of the pressures measured at the location(s) along the pipeline may be determined. Pressure change rates at the location(s) along the pipeline may be determined based on the pressures measured at the location(s) along the pipeline, the moving average of the pressures measured at the location(s) along the pipeline, the sampling interval(s) for the location(s) along the pipeline, and/or other information. A pressure change rate cumulative distribution function for individual ones of the location(s) along the pipeline may be generated based on the pressure change rates at the individual ones of the location(s) along the pipeline and/or other information. Leak probabilities at the location(s) along the pipeline may be determined based on the pressure change rate cumulative distribution function for the individual ones of the location(s) along the pipeline and/or other information. Leak monitoring for the pipeline may be facilitated based on the leak probabilities at the location(s) along the pipeline and/or other information.

A system for monitoring pipeline leaks may include one or more electronic storage, one or more processors and/or other components. The electronic storage may store information relating to a pipeline, pressure information, information relating to pressures measured along the pipeline, information relating to location(s) at which pressure is measured, information relating to a moving average of the pressures measured along the pipeline, information relating to pressure change rates, information relating to pressure change rate cumulative distribution functions, information relating to leak probabilities, information relating to leak monitoring, and/or other information.

The processor(s) may be configured by machine-readable instructions. Executing the machine-readable instructions may cause the processor(s) to facilitate monitoring pipeline leaks. The machine-readable instructions may include one or more computer program components. The computer program components may include one or more of a pressure component, a moving average component, a pressure change rate component, a cumulative distribution function component, a leak probability component, a leak monitoring component, and/or other computer program components.

The pressure component may be configured to obtain pressure information for a pipeline and/or other information. The pressure information may define pressure measured at one or more locations along the pipeline. The pressure measured at the location(s) along the pipeline may include pressure of fluid within the pipeline. The pressure may be measured at the location(s) along the pipeline at a pace of one or more sampling intervals.

The moving average component may be configured to determine a moving average of the pressures measured at the location(s) along the pipeline. In some implementations, the moving average of the pressures measured at the location(s) along the pipeline may include an exponentially weighted moving average of the pressures measured at the location(s) along the pipeline.

The pressure change rate component may be configured to determine pressure change rates at the location(s) along the pipeline. The pressure change rates at the location(s) along the pipeline may be determined based on the pressure measured at the location(s) along the pipeline, the moving average of the pressures measured at the location(s) along the pipeline, the sampling interval(s) for the location(s) along the pipeline, and/or other information.

The cumulative distribution function component may be configured to generate a pressure change rate cumulative distribution function for individual ones of the location(s) along the pipeline. The pressure change rate cumulative distribution function for individual ones of the location(s) along the pipeline may be generated based on the pressure change rates at the individual ones of the location(s) along the pipeline and/or other information.

The leak probability component may be configured to determine leak probabilities at the location(s) along the pipeline. The leak probabilities at the location(s) along the pipeline may be determined based on the pressure change rate cumulative distribution function for the individual ones of the location(s) along the pipeline and/or other information.

In some implementations, a given pressure change rate may be converted into a given leak probability by using the pressure change rate cumulative distribution function as a lookup table. The use of the pressure change rate cumulative distribution function may enable separate pressure measurements at separate locations along the pipeline to be converted into same probability basis.

The leak monitoring component may be configured to facilitate leak monitoring for the pipeline. The leaking monitoring for the pipeline may be facilitated based on the leak probabilities at the location(s) along the pipeline and/or other information. In some implementations, the leak monitoring for the pipeline may include detection of a leak along the pipeline based on a given leak probability at a given location along the pipeline and/or other information. The leak along the pipeline may include a rupture along the pipeline. The given leak probability at the given location along the pipeline may be compared to a leak probability threshold for the detection of the leak along the pipeline.

In some implementations, the leak monitoring for the pipeline may include detection of a leak along the pipeline based on multiple leak probabilities at multiple locations along the pipeline and/or other information. The detection of the leak along the pipeline based on the multiple leak probabilities at the multiple locations along the pipeline may be performed based on timing of the multiple leak probabilities at the multiple locations along the pipeline and/or other information. The detection of the leak along the pipeline based on the multiple leak probabilities at the multiple locations along the pipeline may be performed further based on distance between the multiple locations along the pipeline and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for monitoring pipeline leaks.

FIG. 6 illustrates example numbers of leak detected using pressure measurement from one location and example numbers of leak detected using pressure measurement from multiple locations.

DETAILED DESCRIPTION

The present disclosure relates to monitoring pipeline leaks. Pressures of fluid inside a pipeline are measured at one or more locations along the pipeline. Pressure change rates at the location(s) along the pipeline are determined using the measured pressures, a moving average of the measured pressures, and sampling intervals for the measured pressures. Pressure change rate cumulative distribution function(s) for the location(s) along the pipeline are generated based on the pressure change rates over time. The pressure change rate cumulative distribution function(s) are then used to generate probabilities of leaks along the pipeline, and/or to convert the pressure change rates over time to probabilities of leaks along the pipeline. The probabilities of leaks along the pipeline are used to monitor the pipeline for leaks.

Figure 1:
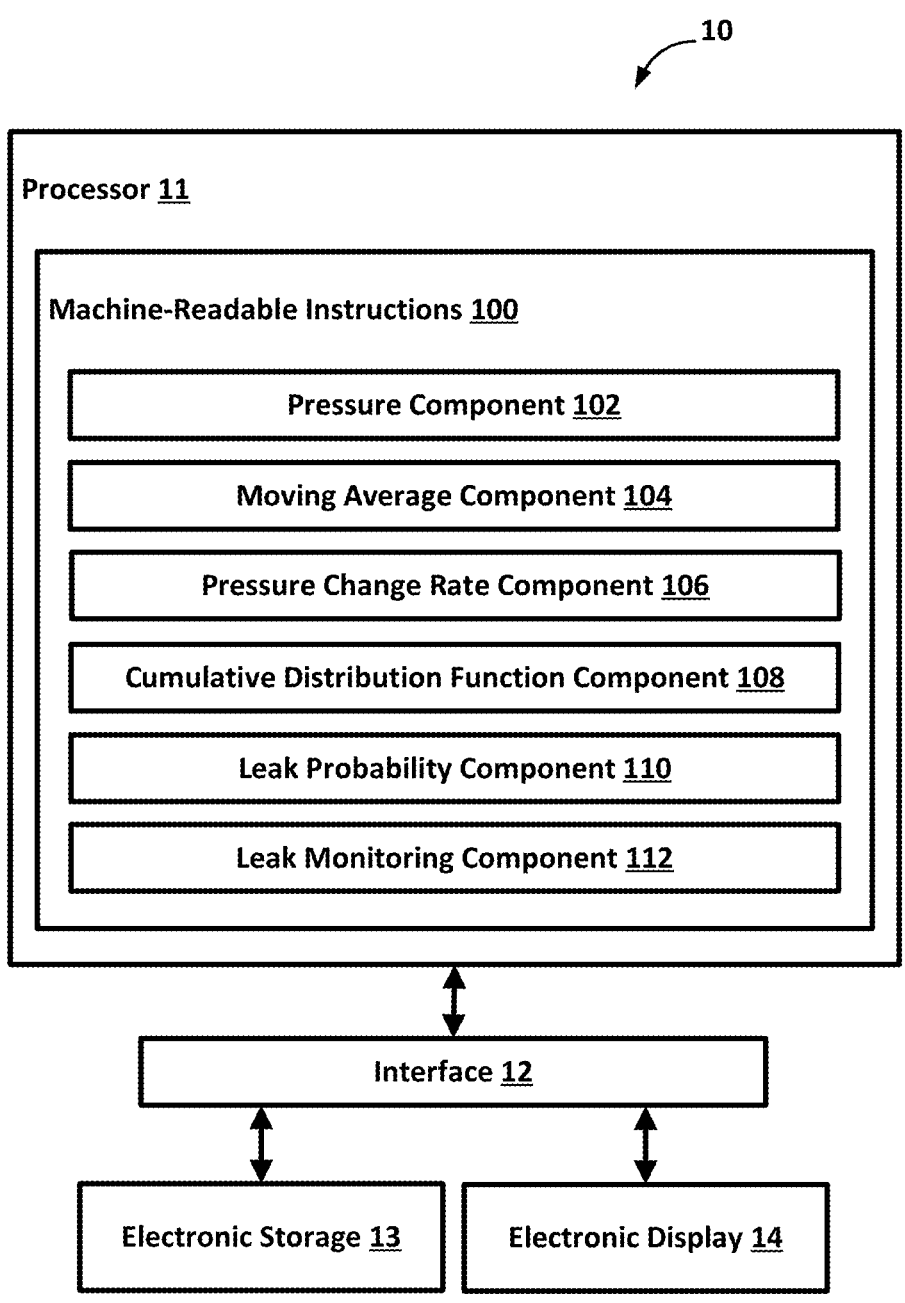
FIG. 1 illustrates an example system for monitoring pipeline leaks.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an electronic display 14, and/or other components. Pressure information for a pipeline and/or other information may be obtained by the processor 11. The pressure information may define pressures measured at one or more locations along the pipeline. The pressures may be measured at the location(s) along the pipeline at a pace of one or more sampling intervals. A moving average of the pressures measured at the location(s) along the pipeline may be determined by the processor 11. Pressure change rates at the location(s) along the pipeline may be determined by the processor 11 based on the pressure measured at the location(s) along the pipeline, the moving average of the pressures measured at the location(s) along the pipeline, the sampling interval(s) for the location(s) along the pipeline, and/or other information.

A pressure change rate cumulative distribution function for individual ones of the location(s) along the pipeline may be generated by the processor 11 based on the pressure change rates at the individual ones of the location(s) along the pipeline and/or other information. Leak probabilities at the location(s) along the pipeline may be determined by the processor 11 based on the pressure change rate cumulative distribution function for the individual ones of the location(s) along the pipeline and/or other information. Leak monitoring for the pipeline may be facilitated by the processor 11 based on the leak probabilities at the location(s) along the pipeline and/or other information.

The electronic storage 13 may be configured to include one or more electronic storage media that electronically stores information. The electronic storage 13 may store software algorithms, information determined by the processor 11, information received remotely, and/or other information that enables the system 10 to function properly. For example, the electronic storage 13 may store information relating to a pipeline, pressure information, information relating to pressures measured along the pipeline, information relating to location(s) at which pressure is measured, information relating to a moving average of the pressures measured along the pipeline, information relating to pressure change rates, information relating to pressure change rate cumulative distribution functions, information relating to leak probabilities, information relating to leak monitoring, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present information relating to a pipeline, pressure information, information relating to pressures measured along the pipeline, information relating to location(s) at which pressure is measured, information relating to a moving average of the pressures measured along the pipeline, information relating to pressure change rates, information relating to pressure change rate cumulative distribution functions, information relating to leak probabilities, information relating to leak monitoring, and/or other information.

Leaks, such as ruptures, along a pipeline may cause loss of fluid and equipment failure. Accurate detection of leaks along a pipeline may enable the leaks to be addressed promptly. For example, rapid, automated responses may reduce the impact from a complete pipeline failure. Software-based detection methods that quickly identify loss of normal containment barriers may be automated and integrated into existing process controls networks via digital tools. Such tools may be designed and implemented to monitor and evaluate field measurements in real-time and to generate real-time estimates of Loss of Containment (LoC) risk. Leaks along a pipeline may result in complete LoC within a very short period of time. A real time LoC risk indicator may be directly integrated with process controls and human machine interfaces, enabling rapid shutdowns of equipment and automation of containment actions.

The present disclosure provides a fast-response leak monitoring tool that is reliable even on noisy systems, such as systems where pressures are subject to compression noise. The tool may convert rate of pressure changes along the pipeline to probability of leak along the pipeline, enabling the use of distribution statistics and setting alarm thresholds based on probability rather than a fixed threshold based on rate. The tool may utilize true time between pressure measurement points for rate calculations, eliminating artificial constants (e.g., tuning parameters) required in conditional rate of change detection methods. Moving averages may be calculated without the use of memory-intensive calculation, such as a sliding window method used in conditional rate of change detection methods, described in "Conditional Rate of Change (C-ROC) Alarm Technical Specifications," Document Number OPS0228. The improvements provided by the present disclosure enable rapid leak detection via monitoring of pressure sensor(s) on a pipeline.

The tool may utilize pressure measurements from multiple locations (pressure monitoring points) along the pipeline to reduce inaccurate detection of leaks (e.g., false alarms) for the pipeline. Concomitant leak behavior at multiple locations along the pipeline (e.g., locations within a shared, enclosed volume) may be identified via analyzing threshold crossings in at the multiple locations along the pipeline. Use of concomitant leak behavior at multiple locations along the pipeline may significantly reduce inaccurate leak detection, and proof of concept testing reduced inaccurate leak detections by an order of magnitude.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate monitoring pipeline leaks. The machine-readable instructions 100 may include one or more computer program components. The machine-readable instructions 100 may include one or more of a pressure component 102, a moving average component 104, a pressure change rate component 106, a cumulative distribution function component 108, a leak probability component 110, a leak monitoring component 112, and/or other computer program components.

The pressure component 102 may be configured to obtain pressure information for a pipeline and/or other information. The act of obtaining pressure information may include one or more of accessing, acquiring, analyzing, creating, determining, examining, generating, identifying, loading, locating, measuring, opening, receiving, retrieving, reviewing, selecting, storing, utilizing, and/or otherwise obtaining the pressure information. The pressure component 102 may obtain pressure information from one or more locations. For example, the pressure component 102 may obtain pressure information from a storage location, such as the electronic storage 13, electronic storage of a device accessible via a network, and/or other locations. The pressure component 102 may obtain pressure information from one or more hardware components (e.g., a computing device, a pressure sensor) and/or one or more software components (e.g., software running on a computing device). Pressure information may be stored within a single file or multiple files.

The pressure information for a pipeline may define pressure measured at one or more locations along the pipeline. A pipeline may refer to a system of pipes for transportation of materials (e.g., liquid, gas). A pipe may refer to a tube or hollow body for transporting materials. A pipeline may be located in the ground, on the ground, above the ground, and/or submerged. Pressure measured at a location along the pipeline may refer to the pressure inside the pipeline at the location. Pressure measured at a location along the pipeline may refer to pressure of fluid (fluid pressure) at the location along the pipeline. The pressure at a location along the pipeline may be measured using one or more pressure sensors. The pressure may be measured at a location along the pipeline at a pace of one or more sampling intervals. A sampling interval may refer to the amount of time between different pressure measurements. A sampling interval may be the inverse of the sampling frequency. The pressure may be measured at a location along the pipeline using a constant sampling interval or changing sampling intervals. The pressure may be measured at different locations along the pipeline using the same sampling interval of different sampling intervals.

The pressure information for a pipeline may define pressure measured at location(s) along the pipeline for a duration of time. The pressure information for a pipeline may include a collection of pressure sensor readings at the location(s) for a duration of time. The pressure information for a pipeline may define historical pressure measured at location(s) along the pipeline and/or real-time (e.g., current/latest) pressure measured at location(s) along the pipeline.

The pressure information may define pressure measured at a location along the pipeline by characterizing, describing, identifying, quantifying, reflecting, and/or otherwise defining the pressure measured at the location along the pipeline. The pressure information may define pressure measured at a location along the pipeline by including information that defines one or more content, qualities, attributes, features, and/or other aspects of the pressure measured at the location along the pipeline. For example, the pressure information may define pressure measured at a location along the pipeline by including information that specifies values of the pressure measured at the location, and/or information that is used to determine the pressure measured at the location. Other types of pressure information are contemplated.

Figure 3:
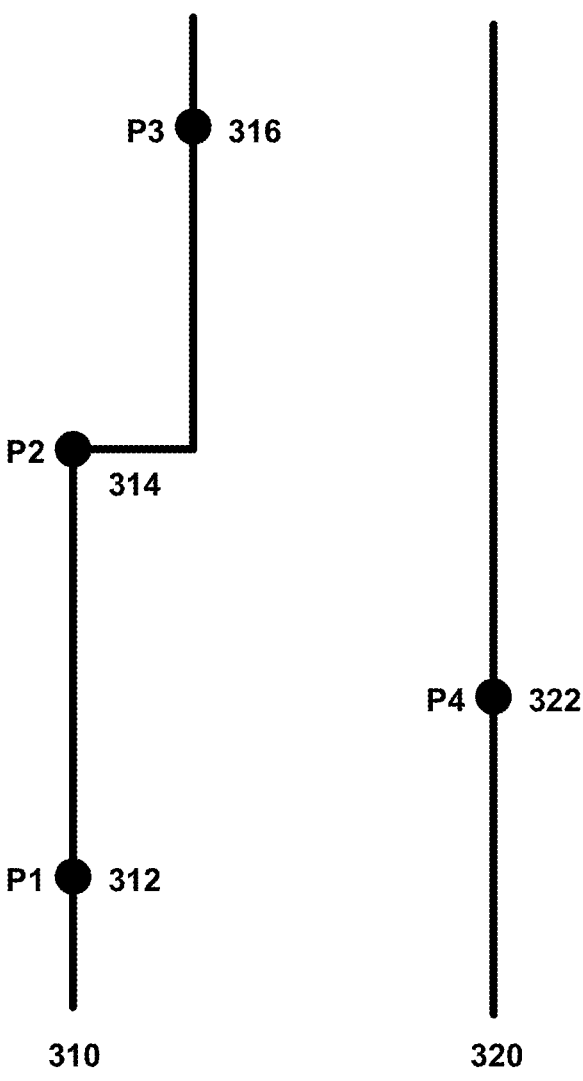
FIG. 3 illustrates example locations of pressure measurement along pipelines.

FIG. 3 illustrates example locations of pressure measurement along pipelines 310, 320. Pressure sensors may be positioned at three locations 312, 314, 316 along the pipeline 310 and a pressure sensor may be positioned at a location 322 along the pipeline 320. Pressure measurements (P1, P2, P3, P4) from different locations along the pipelines 310, 320 may be obtained. Historical and/or real-time pressure measurements (P1, P2, P3, P4) may be obtained.

The moving average component 104 may be configured to determine a moving average of the pressures measured at the location(s) along the pipeline. Determining a moving average of the pressures measured at the location(s) along the pipeline may include ascertaining, approximating, calculating, establishing, estimating, finding, identifying, obtaining, quantifying, selecting, setting, and/or otherwise determining the moving average of the pressures measured at the location(s) along the pipeline. A moving average of the pressures measured at the location(s) along the pipeline may be determined for individual locations at which the pressures are measured. Separate moving average of the pressures measured at the location(s) along the pipeline may be determined for separate locations at which the pressures are measured. A moving average of pressures measured at a location along the pipeline may refer to an average of the pressures measured at the location along the pipeline for a duration of time. A collection of pressure measurements obtained the pressures measured at the location for a duration of time may be averaged to obtain a moving average of the pressures measured at the location, so as to smooth the values of the pressures measured at the location.

In some implementations, the moving average of the pressures measured at the location(s) along the pipeline may include an exponentially weighted moving average of the pressures measured at the location(s) along the pipeline. Use of exponential moving average to calculate the moving average may result in greater weight/significance being placed on more recent pressure measurement. Use of other moving average is contemplated.

The pressure change rate component 106 may be configured to determine pressure change rates at the location(s) along the pipeline. Determining pressure change rates at the location(s) along the pipeline may include ascertaining, approximating, calculating, establishing, estimating, finding, identifying, obtaining, quantifying, selecting, setting, and/or otherwise determining the pressure change rates at the location(s) along the pipeline. Pressure change rates may be determined for individual locations at which pressure is measured. Separate pressure change rates may be determined for separate locations at which pressure is measured. A pressure change rate at a location may refer to a rate at which pressure (measured pressure) is changing at the location. A pressure change rate at a location may refer to an amount by which pressure is changing over a duration of time.

The pressure change rates at the location(s) along the pipeline may be determined based on the pressure measured at the location(s) along the pipeline, the moving average of the pressure measured at the location(s) along the pipeline, the sampling interval(s) for the location(s) along the pipeline, and/or other information. The pressure change rate for a particular time ($D_t$) may be calculated as the difference between the pressure measured at the particular time ($P_t$) and the moving average for the particular time ($\overline{P}$), divided by the sampling interval ($\delta$) at the location. The difference between the pressure measured at the particular time ($P_t$) and the moving average for the particular time ($\overline{P}(t)$) may be referred to as bias ($C_t$):

$$C_t = P_t - \overline{P}(t),$$

$$D_t = \frac{C_t}{\delta}$$

The pressure change rate at a location along the pipeline may be used to detect leaks at the location and/or other locations along the pipeline. For example, the pressure jumping up or dropping down by/more than a certain amount within a particular duration of time may be flagged as a potential leak at that location or at nearby location. For instance, a pressure change rate that exceeds 20 psi/s may be flagged as a potential leak. However, such detection of leaks may require determination of "normal"/non-leak pressure change rates for every pressure sensor. Different pressure change rate thresholds may be required for different pressure sensors and/or different locations along the pipeline. Such detection of leaks may not facilitate comprehensive leak detection, such as leak detection incorporating pressure measurements over the entire pipeline. Rather than using the pressure change rates themselves to detect leaks, the present disclosure converts the pressure change rates into probabilities of leak via a pressure change rate cumulative distribution function.

The cumulative distribution function component 108 may be configured to generate a pressure change rate cumulative distribution function for individual ones of the location(s) along the pipeline. Generating a pressure change rate cumulative distribution function may include calculating, creating, determining, estimating, producing, quantifying, storing, utilizing, and/or otherwise generating the pressure change rate cumulative distribution function. A pressure change rate cumulative distribution function may be generated for individual locations at which pressure is measured. Separate pressure change rate cumulative distribution functions may be generated for separate locations at which pressure is measured. A pressure change rate cumulative distribution function for a location may refer to a function that defines/describes distribution of pressure change rates determined at the location. A pressure change rate cumulative distribution function for a location may provide the probability of the pressure change rate at the location being less than or equal to an x-value. A pressure change rate cumulative distribution function may sum the total likelihood up to an x-value, with the output ranging between zero and one. The pressure change rate cumulative distribution function may also be expressed as a cumulative percent probability, with the output ranging between zero and one hundred percent.

The pressure change rate cumulative distribution function for individual ones of the location(s) along the pipeline may be generated based on the pressure change rates at the individual ones of the location(s) along the pipeline and/or other information. The pressure change rate cumulative distribution function for a particular location may be generated based on the pressure change rates at the particular location and/or other information. The pressure change rate cumulative distribution function for a particular location may be generated based on the distribution of the pressure change rates at the particular location. Pressure change rates determined for different times at the particular location may be used to generate the pressure change rate cumulative distribution function. The pressure change rate cumulative distribution function for a location may be generated as a histogram of the pressure change rates at the locations. For example, the pressure change rates at the locations may be binned across the x-axis and the number times the pressure change rates falls within a bin may be indicated by the y-value of the pressure change rate cumulative distribution function. The pressure change rate cumulative distribution function for a location may be updated based on newly measured pressure at the location.

Figure 4A:
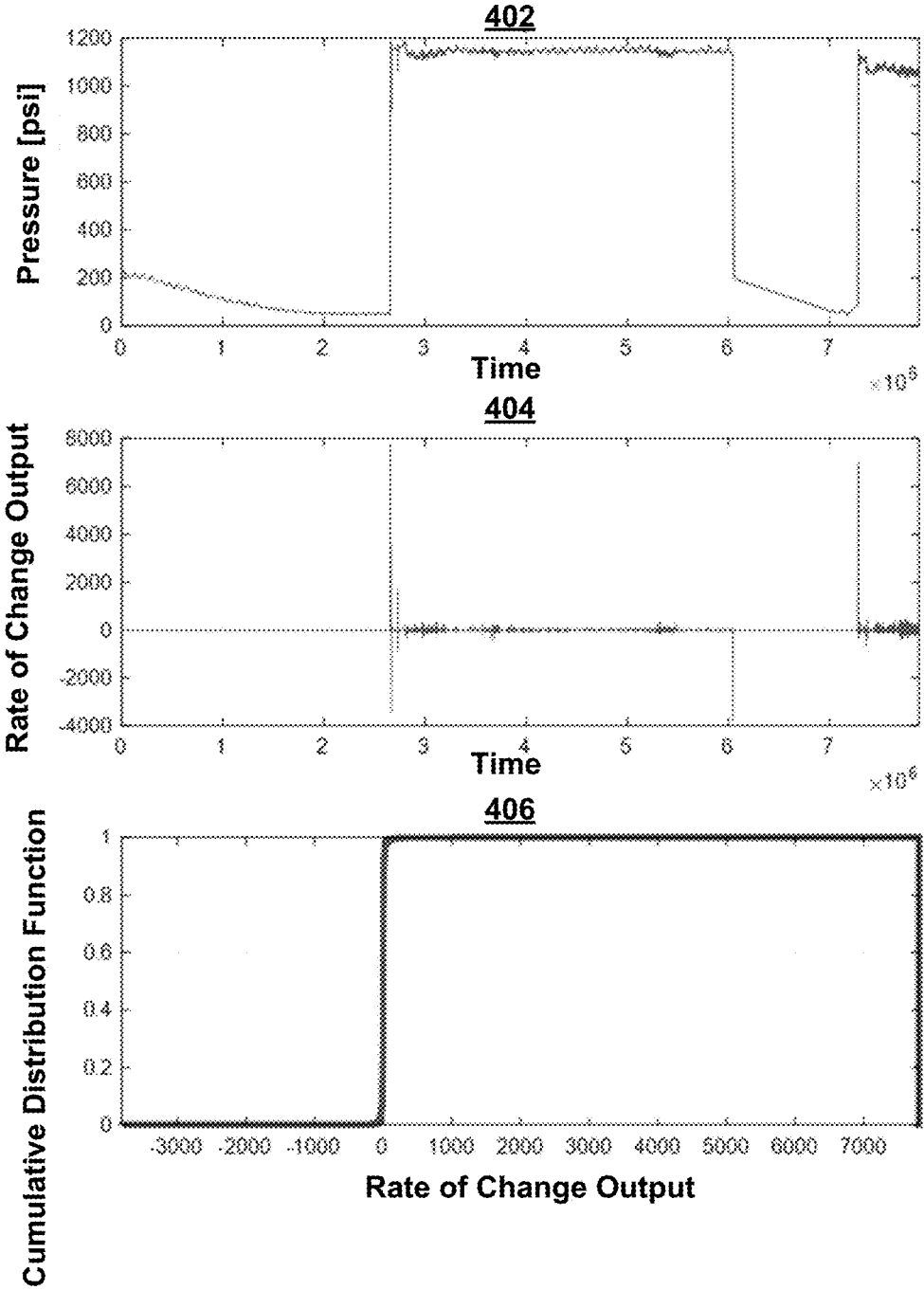
FIG. 4A illustrates examples of pressure measurement, rate of pressure change, and pressure change rate cumulative distribution function.

FIG. 4A illustrates examples of pressure measurement 402, rate of pressure change 404, and pressure change rate cumulative distribution function 406 for a location along a pipeline. The pressure measurement 402 may show values of the pressure measured at the location over time. The rate of pressure change 404 may show changes in the pressure measurement 402. Large changes in the pressure measurement 402 may show up as spikes (positive spike, negative spike) on the rate of pressure change 404. Variations in the rate of pressure change 404 may be due to leaks along the pipeline and/or noise. The pressure change rate cumulative distribution function 406 may be generated based on values of the rate of pressure change 404 over time. The x-value of the pressure change rate cumulative distribution function 406 may correspond to specific values of the rate of pressure change 404.

Figure 4B:
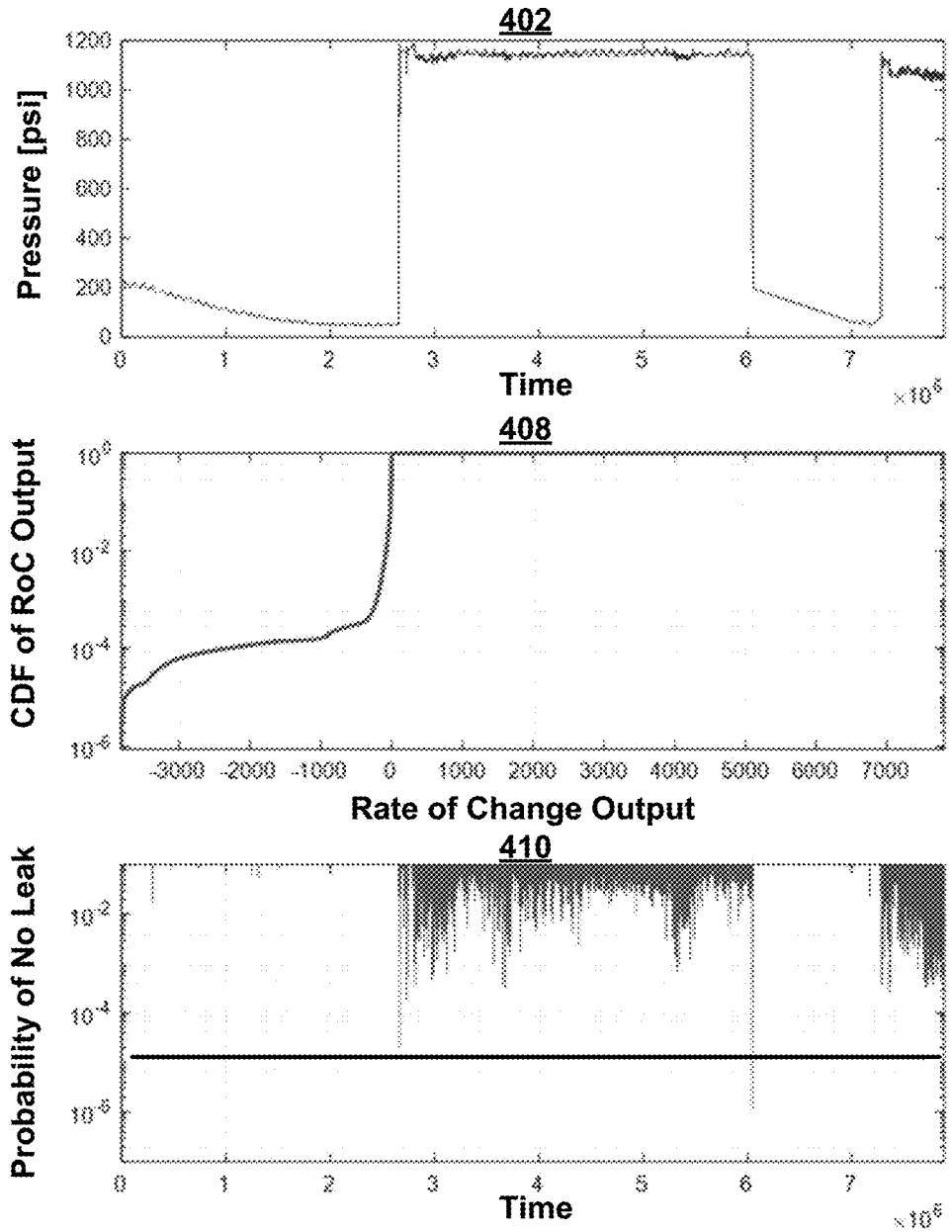
FIG. 4B illustrates examples of pressure measurement, pressure change rate cumulative distribution function, and probability of no leak.

FIG. 4B illustrates examples of the pressure measurement 402 and pressure change rate cumulative distribution function 408. The pressure change rate cumulative distribution function 408 in FIG. 4B may be shown with a different y-scale than the pressure change rate cumulative distribution function 406 in FIG. 4A.

The leak probability component 110 may be configured to determine leak probabilities at the location(s) along the pipeline. Determining the leak probabilit(ies) at the location (s) along the pipeline may include ascertaining, approximating, calculating, establishing, estimating, finding, identifying, obtaining, quantifying, selecting, setting, and/or otherwise determining the leak probabilit(ies) at the location (s) along the pipeline. A leak probability may be determined for individual locations at which pressure is measured. Separate leak probabilities may be determined for separate locations at which pressure is measured. Separate leak probabilities may be determined at different times for a location along the pipeline. A leak probability for a location may refer to the extent to which a leak is present at the location. A leak probability for a location may refer to the possibility that a leak is present at the location. A leak along a pipeline may refer to loss of fluid from the pipeline. A leak along a pipeline may be caused by one or more structural defects along the pipeline. For example, a leak along a pipeline may be caused by a hole/crack in the pipeline or a rupture of the pipeline. Other types of leak along the pipeline are contemplated. Determining a leak probability at a location may include determining the value of probability that a leak is present at the location and/or determining the value of probability that a leak is not present at the location.

The leak probabilities at the location(s) along the pipeline may be determined based on the pressure change rate cumulative distribution function for the individual ones of the location(s) along the pipeline and/or other information. The leak probabilities at a location along the pipeline may be determined based on the pressure change rate cumulative distribution function for the location along the pipeline and/or other information. The pressure change rate cumulative distribution function for the location along the pipeline may be used to convert the pressure change rate(s) at the location into probabilities of leak at the location. The pressure change rate cumulative distribution function for the location along the pipeline may be used as a lookup table to convert values of pressure change rate into values of leak probability at the location.

For example, referring to the pressure change rate cumulative distribution function 408 shown in FIG. 4B, values of pressure change rate may be converted into values of no leak probability using values of the pressure change rate cumulative distribution function 408. Probability of no leak 410 may include values of no leak probability that were converted from the rate of pressure change 404 (shown in FIG. 4A) using the pressure change rate cumulative distribution function 408. For instance, if the value of pressure change rate at a particular time is −2000, then the value of no leak probability may be determined to be $10^{-4}$ or 0.0001 (the corresponding value of the pressure change rate cumulative distribution function 408).

One or more leak probability threshold may be used to determine when leak is present. For example, a leak probability exceeding (e.g., rising above, falling below) a leak probability threshold may be flagged as a leak. For instance, no leak probabilities below a threshold of 0.001 may be flagged as a leak. The value(s) of leak probability thresholds may be set to exclude measurements that fall within the expected range of operating noise. The value(s) of leak probability thresholds may be set based on historical pressure measurements and known occurrences of leaks so that the leak probabilities for the known occurrences of leak exceed the probability threshold. Alternatively, the value(s) of leak probability thresholds may be set based on simulated pressure measurements and simulated occurrences of leaks or set based on any combination of simulated and historical pressure measurements and occurrences of leaks.

The use of the pressure change rate cumulative distribution function may enable separate pressure measurements at separate locations along the pipeline to be converted into same probability basis. Regardless of differences in structural configuration of the pipeline, differences in operation of the pipeline, differences in pressure sensors that are used, and/or differences in how the pressure sensors are operated at the different pressure measurement locations along the pipeline, the pressure change rate cumulative distribution function may be used to convert the pressure measurements at the different locations along the pipeline into the same probability basis.

Figure 5A:
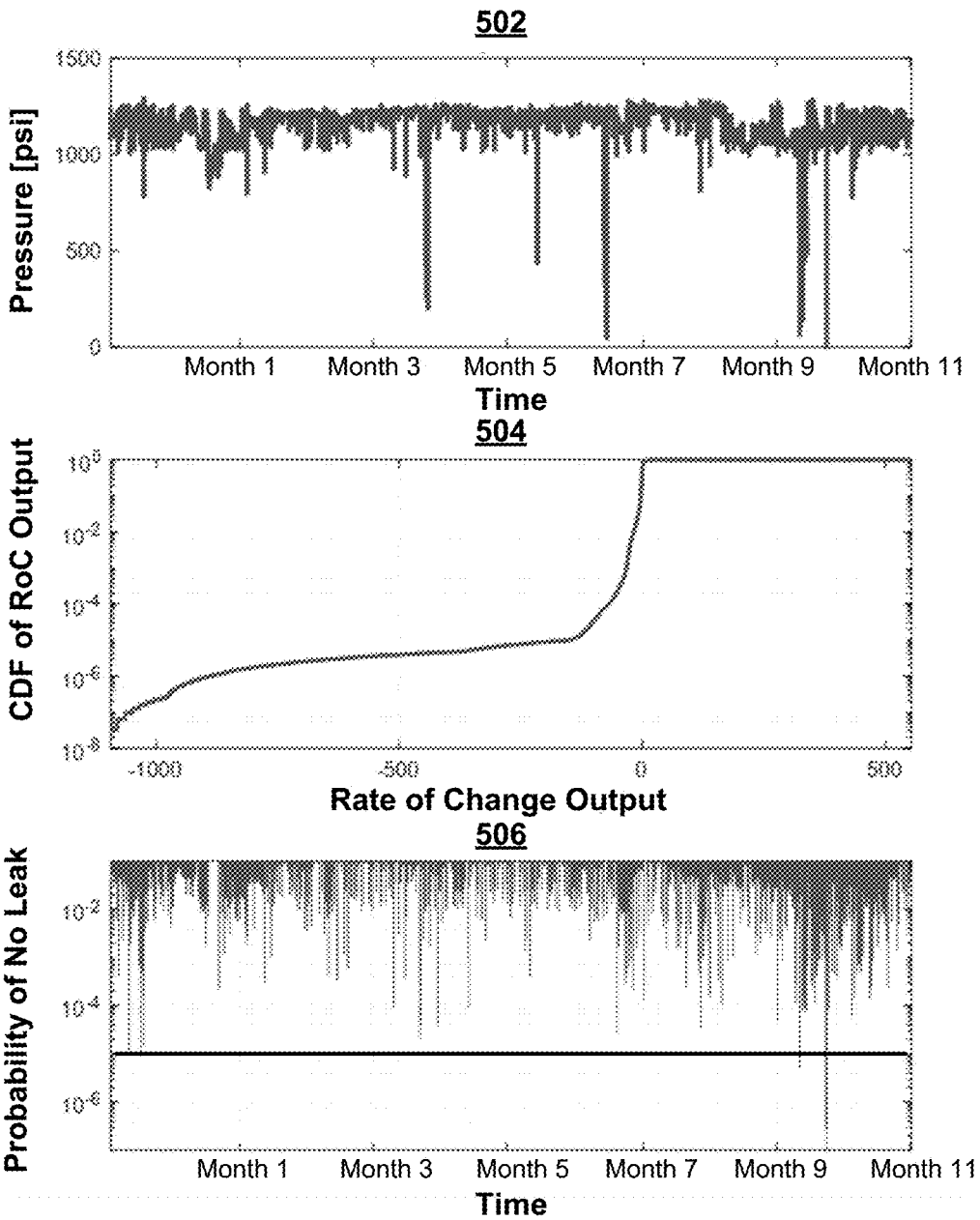
FIG. 5A illustrates examples of pressure measurement, pressure change rate cumulative distribution function, and probability of no leak.
Figure 5B:
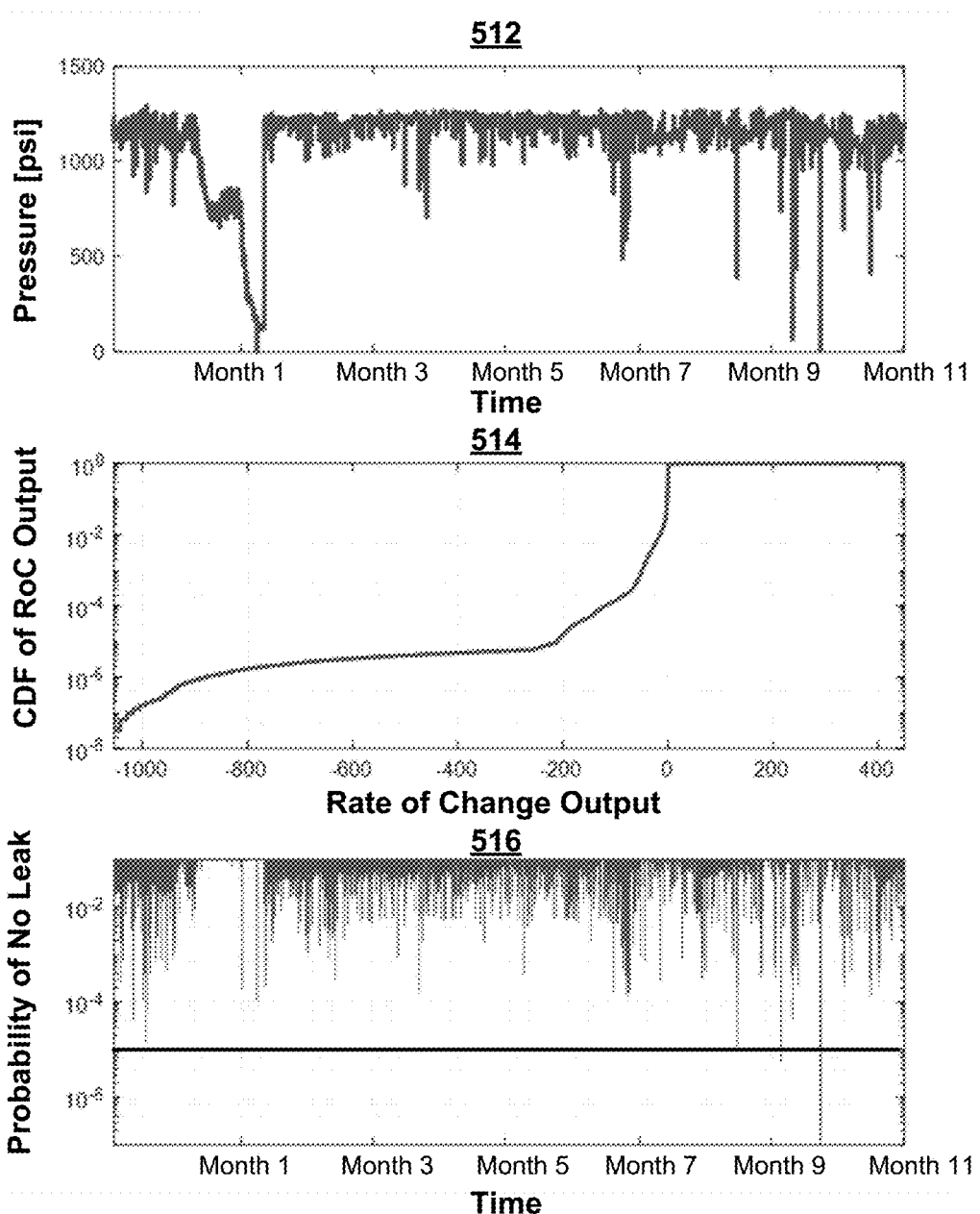
FIG. 5B illustrates examples of pressure measurement, pressure change rate cumulative distribution function, and probability of no leak.

FIGS. 5A and 5B illustrates examples of pressure measurements 502, 512, pressure change rate cumulative distribution functions 504, 514, and probabilities of no leak 506, 516 for two different locations. The pressure measurements 502, 512 may be made at the two locations using pressure sensors positioned at the two locations. The pressure change rate cumulative distribution functions 504, 514 for the two locations may be generated based on the pressure measurements 502, 512 (e.g., based on moving average and pressure change rates from the pressure measurements 502, 512) at the two locations. The pressure changes rates at the two locations may be converted into the probabilities of no leak 506, 516 via the pressure change rate cumulative distribution functions 504, 514 for the two locations. The pressure measurements 502, 512 at the two locations may be converted into the same probability basis.

The leak monitoring component 112 may be configured to facilitate leak monitoring for the pipeline. Facilitating leak monitoring for the pipeline may include assisting, automating, carrying out, controlling, designing, enabling, implementing, initiating, performing, planning, scheduling, setting up, and/or otherwise facilitating the leak monitoring for the pipeline. Leak monitoring for the pipeline may refer to detecting, observing, tracking, checking, maintaining surveillance over, and/or otherwise monitoring the pipeline for potential leaks. Leak monitoring for the pipeline may include detection of leaks along the pipeline. Leak monitoring for the pipeline may include determination of when and where leaks occur along the pipeline. For example, leak monitoring may include detection of ruptures along the pipeline. Leak monitoring may include determination of when and where ruptures occur along the pipeline. Monitoring of other types of leaks is contemplated.

The leaking monitoring for the pipeline may be facilitated based on the leak probabilities at the location(s) along the pipeline and/or other information. The leaking monitoring for the pipeline may be facilitated based on information relating to and/or determined from the leak probabilities at the location(s) along the pipeline to perform leak monitoring for the pipeline. For example, facilitation of leak monitoring for the pipeline may include (1) presenting the leak probabilities on the electronic display 14, (2) presenting information relating to and/or determined from the leak probabilities on the electronic display 14, (3) presenting results of leak monitoring on the electronic display 14, (4) providing information relating to and/or determined from the leak probabilities to one or more leak monitoring processes, and/or (5) performing leak monitoring for the pipeline using information relating to and/or determined from the leak probabilities.

In some implementations, leak monitoring for the pipeline may be facilitated using one or more leak probability thresholds. For example, the leak monitoring for the pipeline may include detection of a leak along the pipeline based on a leak probability at a location along the pipeline and/or other information. The values of the leak probabilities may be used to detect leaks along the pipeline. A leak probability at a location along the pipeline may be compared to a leak probability threshold for the detection of the leak along the pipeline. A leak may be detected at the corresponding location (location at/near which the pressure measurements were made) along the pipeline based on the leak probability exceeding the leak probability threshold.

In some implementations, one or more operations for the pipeline may be facilitated based on the leak monitoring for the pipeline. Based on detection of a leak at a location along the pipeline, one or more operations for the pipeline may be facilitated. For example, one or more leak alarm generation/provision may be facilitated. One or more inspection operations to confirm/assess the leak may be facilitated. One or more remedial operations to fix the leak and/or reduce (e.g., decrease, minimize, eliminate) the impact of the leak may be facilitated.

In some implementations, the leak monitoring for the pipeline may include detection of a leak along the pipeline based on multiple leak probabilities at multiple locations along the pipeline and/or other information. Pressure measurements from multiple locations along the pipeline may be used in leak monitoring for the pipeline. Use of pressure measurements/leak properties at multiple locations along the pipeline may increase the accuracy of leak monitoring for the pipeline. Use of pressure measurements/leak properties at multiple locations along the pipeline may make leak monitoring more reliable. For example, if a leak occurs at a location that is near multiple pressure sensors, then pressure measurements/leak properties at those nearby sensor locations should indicate the leak. If pressure measurement/leak property at nearby sensor locations conflict on occurrence of the leak (e.g., leak detected at one nearby location and not detected at another nearby location), the detected leak may be a false positive. Pressure measurements/leak properties from multiple locations may be used to reduce false positives in leak monitoring. In some implementations, pressure measurements/leak probabilities at different pipelines may be considered. For example, referring to FIG. 3, leak probabilities at locations 312, 314, 316 and at location 322 may be considered in determining whether a leak is occurring along the pipeline 310 and/or the pipeline 320.

Detection of leak along the pipeline based on the multiple leak probabilities at the multiple locations along the pipeline may be performed based on timing of the multiple leak probabilities at the multiple locations along the pipeline and/or other information. The difference in times at which leaks are "detected" (e.g., via crossing of the leak probability threshold) at individual locations may be used to determine whether a leak detected is a false positive or a real leak. The response times between multiple locations may be used to classify a detected leak as being false positive or a real leak.

For example, in FIG. 3, detection of leak along the pipeline 310 may be performed based on multiple leak probabilities at three locations 312, 314, 316. Timing of the multiple leak probabilities at three locations 312, 314, 316 may be used to determine whether a leak has occurred along the pipeline 310. For example, for a leak to be detected along the pipeline 310, the leak probabilities at two or more of the locations 312, 314, 316 may need to exceed the leak probability threshold within a threshold duration of time (e.g., ten seconds). Multiple leak probabilities at multiple locations exceeding the leak probability threshold within the threshold duration of time may be referred to as concomitant leak behavior.

Same or different threshold durations of time may be used for different locations of pressure measurement. The threshold duration of time may be set for all of the locations or between different locations. For example, in FIG. 3, the threshold duration of time may be set to be ten seconds for all leak probabilities at the three locations 312, 314, 316. Leak probability at the three locations 312, 314, 316 may need to exceed the leak probability threshold within ten seconds for a leak to be detected. As another example, the threshold duration of time may be set to be ten seconds between leak probabilities at the three locations 312, 314, 316. If the leak probabilities at the three locations 312, 314, 316 exceeded the leak probability threshold within ten seconds of another leak probability exceeding the leak probability threshold, a leak may be detected. Threshold durations of time may be set by measurements, simulations, historical analysis, or any combination thereof. Other use of timing of multiple leak probabilities at multiple locations along the pipeline are contemplated.

The detection of leak along the pipeline based on the multiple leak probabilities at the multiple locations along the pipeline may be performed further based on distance between the multiple locations along the pipeline and/or other information. The distance between individual locations at which leaks are "detected" may be used to determine whether a leak detected is a false positive or a real leak. The distance between the locations of pressure measurement may be used to determine whether the leak probabilities at different locations should be considered together. The distance between the locations of pressure measurement may be used to determine the timing of leak probabilities that are required. The distance between the locations of pressure measurement may take into account connections and/or piping components between locations.

In some implementations, the detection of leak along the pipeline may be performed further based on operation(s) of the pipeline. Operation(s) of the pipeline may introduce noise into the system and whether and/or how leaks are detected may be adjusted/controlled based on the pipeline operation(s) that are being performed. For example, leak probability thresholds, timing thresholds, and/or distance thresholds may be modified based on the type of pipeline operation(s) being performed. As another example, fingerprints of leak probabilities may be generated based on leak probabilities at one or more locations along the pipeline during performance on operations. A fingerprint of leak probabilities may include one or more patterns in values of leak probabilities, changes in values of leak probabilities, timing of leak detection (e.g., when leaks are detected at one or more locations, the durations of time between leaks detected at multiple locations), and/or other patterns relating to leak probabilities. These fingerprints may be used to detect false positives of leak detection when these operations are being performed.

FIG. 6 illustrates example numbers of leak detected using pressure measurement from one location 600 and example numbers of leak detected using pressure measurement from multiple locations 650. When using pressure measurement from one location 600, a leak may be detected at a location when the leak probability at the location exceeds the leak probability thresholds. The leak detection using individual leak probabilities may result in detection of 55 flagged leak events at location A, 76 flagged leak events at location B, 91 flagged leak events at location C, 124 flagged leak events at location D, and 88 flagged leak events at location E.

When using pressure measurement from multiple locations 650, a leak may be detected if the leak probability at the location exceeds the leak probability threshold and the leak probability at another location exceeds the leak probability threshold within a threshold duration of time. The leak detection using multiple leak probabilities may result in detection of 3 flagged leak events using pressure measurement at locations A and B, 9 flagged leak events using pressure measurement at locations A and C, 5 flagged leak events using pressure measurement at locations A and D, 5 flagged leak events using pressure measurement at locations A and E, 6 flagged leak events using pressure measurement at locations B and C, 4 flagged leak events using pressure measurement at locations B and D, 5 flagged leak events using pressure measurement at locations B and E, 12 flagged leak events using pressure measurement at locations C and D, 7 flagged leak events using pressure measurement at locations C and E, and 25 flagged leak events using pressure measurement at locations D and E. While FIG. 6 shows use of pairs of leak probabilities to detect leaks, this is merely as an example and is not meant to be limiting. Other numbers of leak probabilities may be used to detect leaks.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a non-transitory, tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the electronic display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates a method 200 for monitoring pipeline leaks. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, pressure information for a pipeline and/or other information may be obtained. The pressure information may define pressures measured at one or more locations along the pipeline. The pressures may be measured at the location(s) along the pipeline at a pace of one or more sampling intervals. The subsurface properties may be correlated. In some implementations, operation 202 may be performed by a processor component the same as or similar to the pressure component 102 (Shown in FIG. 1 and described herein).

At operation 204, a moving average of the pressures measured at the location(s) along the pipeline may be determined. In some implementations, operation 204 may be performed by a processor component the same as or similar to the moving average component 104 (Shown in FIG. 1 and described herein).

At operation 206, pressure change rates at the location(s) along the pipeline may be determined based on the pressures measured at the location(s) along the pipeline, the moving average of the pressures measured at the location(s) along the pipeline, the sampling interval(s) for the location(s) along the pipeline, and/or other information. In some implementations, operation 206 may be performed by a processor component the same as or similar to the pressure change rate component 106 (Shown in FIG. 1 and described herein).

At operation 208, a pressure change rate cumulative distribution function for individual ones of the location(s) along the pipeline may be generated based on the pressure change rates at the individual ones of the location(s) along the pipeline and/or other information. In some implementations, operation 208 may be performed by a processor component the same as or similar to the cumulative distribution function component 108 (Shown in FIG. 1 and described herein).

At operation 210, leak probabilities at the location(s) along the pipeline may be determined based on the pressure change rate cumulative distribution function for the individual ones of the location(s) along the pipeline and/or other information. In some implementations, operation 210 may be performed by a processor component the same as or similar to the leak probability component 110 (Shown in FIG. 1 and described herein).

At operation 212, leak monitoring for the pipeline may be facilitated based on the leak probabilities at the location(s) along the pipeline and/or other information. In some implementations, operation 212 may be performed by a processor component the same as or similar to the leak monitoring component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for monitoring pipeline leaks, the system comprising: one or more physical processors configured by machine-readable instructions to:

obtain pressure information for a pipeline, the pressure information defining pressures measured at one or more locations along the pipeline at a pace of one or more sampling intervals;

determine a moving average of the pressures measured at the one or more locations along the pipeline, the moving average of the pressures being an average of the pressures measured at the one or more locations along the pipeline at the pace of the one or more sampling intervals for a duration of time;

determine pressure change rates at the one or more locations along the pipeline based on the pressures measured at the one or more locations along the pipeline, the moving average of the pressures measured at the one or more locations along the pipeline, and the one or more sampling intervals for the one or more locations along the pipeline;

generate a pressure change rate cumulative distribution function for individual ones of the one or more locations along the pipeline based on the pressure change rates at the individual ones of the one or more locations along the pipeline, the pressure change rate cumulative distribution function being a function that defines or describes distribution of the pressure change rates determined at the individual ones of the one or more locations along the pipeline over time;

determine leak probabilities at the one or more locations along the pipeline based on the pressure change rate cumulative distribution function for the individual ones of the one or more locations along the pipeline; and facilitate leak monitoring for the pipeline based on the leak probabilities at the one or more locations along the pipeline.

2. The system of claim 1, wherein the moving average of the pressures measured at the one or more locations along the pipeline includes an exponentially weighted moving average of the pressures measured at the one or more locations along the pipeline.

3. The system of claim 1, wherein the leak monitoring for the pipeline includes detection of a leak along the pipeline based on a given leak probability at a given location along the pipeline.

4. The system of claim 3, wherein the given leak probability at the given location along the pipeline is compared to a leak probability threshold for the detection of the leak along the pipeline.

5. The system of claim 3, wherein the leak along the pipeline includes a rupture along the pipeline.

6. The system of claim 1, wherein the leak monitoring for the pipeline includes detection of a leak along the pipeline based on multiple leak probabilities at multiple locations along the pipeline.

7. The system of claim 6, wherein the detection of the leak along the pipeline based on the multiple leak probabilities at the multiple locations along the pipeline is performed based on timing of the multiple leak probabilities at the multiple locations along the pipeline.

8. The system of claim 7, wherein the detection of the leak along the pipeline based on the multiple leak probabilities at the multiple locations along the pipeline is performed further based on distance between the multiple locations along the pipeline.

9. The system of claim 1, wherein a given pressure change rate is converted into a given leak probability by using the pressure change rate cumulative distribution function as a lookup table.

10. The system of claim 9, wherein the use of the pressure change rate cumulative distribution function enables separate pressure measurements at separate locations along the pipeline to be converted into same probability basis.

11. A method for monitoring pipeline leaks, the method comprising:

obtaining pressure information for a pipeline, the pressure information defining pressures measured at one or more locations along the pipeline at a pace of one or more sampling intervals;

determining a moving average of the pressures measured at the one or more locations along the pipeline, the moving average of the pressures being an average of the pressures measured at the one or more locations along the pipeline at the pace of the one or more sampling intervals for a duration of time;

determining pressure change rates at the one or more locations along the pipeline based on the pressures measured at the one or more locations along the pipeline, the moving average of the pressures measured at the one or more locations along the pipeline, and the one or more sampling intervals for the one or more locations along the pipeline;

generating a pressure change rate cumulative distribution function for individual ones of the one or more locations along the pipeline based on the pressure change rates at the individual ones of the one or more locations along the pipeline, the pressure change rate cumulative distribution function being a function that defines or describes distribution of the pressure change rates determined at the individual ones of the one or more locations along the pipeline over time;

determining leak probabilities at the one or more locations along the pipeline based on the pressure change rate cumulative distribution function for the individual ones of the one or more locations along the pipeline; and facilitating leak monitoring for the pipeline based on the leak probabilities at the one or more locations along the pipeline.

12. The method of claim 11, wherein the moving average of the pressures measured at the one or more locations along the pipeline includes an exponentially weighted moving average of the pressures measured at the one or more locations along the pipeline.

13. The method of claim 11, wherein the leak monitoring for the pipeline includes detection of a leak along the pipeline based on a given leak probability at a given location along the pipeline.

14. The method of claim 13, wherein the given leak probability at the given location along the pipeline is compared to a leak probability threshold for the detection of the leak along the pipeline.

15. The method of claim 13, wherein the leak along the pipeline includes a rupture along the pipeline.

16. The method of claim 11, wherein the leak monitoring for the pipeline includes detection of a leak along the pipeline based on multiple leak probabilities at multiple locations along the pipeline.

17. The method of claim 16, wherein the detection of the leak along the pipeline based on the multiple leak probabilities at the multiple locations along the pipeline is performed based on timing of the multiple leak probabilities at the multiple locations along the pipeline.

18. The method of claim 17, wherein the detection of the leak along the pipeline based on the multiple leak probabilities at the multiple locations along the pipeline is performed further based on distance between the multiple locations along the pipeline.

19. The method of claim 11, wherein a given pressure change rate is converted into a given leak probability by using the pressure change rate cumulative distribution function as a lookup table.

20. The method of claim 19, wherein the use of the pressure change rate cumulative distribution function enables separate pressure measurements at separate locations along the pipeline to be converted into same probability basis.

* * * * *